United States Patent [19]

Brown

[11] 3,710,885
[45] Jan. 16, 1973

[54] VEHICLE ENGINE MOUNTING

[76] Inventor: Robley C. Brown, 333 Ervilla Street, Pomona, Calif. 91767

[22] Filed: Jan. 18, 1971

[21] Appl. No.: 107,106

[52] U.S. Cl. ............................................. 180/64 M
[51] Int. Cl. ............................................... B60k 5/12
[58] Field of Search .......... 180/64 M, 64 R, 1, 54, 55, 180/57

[56] References Cited

UNITED STATES PATENTS 1,900,773   3/1933   Staniewicz .......................... 180/64 M
2,893,502   7/1959   Scheuerpflug ....................... 180/64 R

*Primary Examiner*—Benjamin Hersh
*Assistant Examiner*—Milton L. Smith
*Attorney*—Allan D. Mockabee

[57] ABSTRACT

An automotive vehicle including an engine having a drive connection to an axle, the drive connection being provided with a universal joint adjacent the engine, the engine being mounted on the sub-frame having a pivotal connection with the main frame on a vertical axis coincident with the universal joint, the sub-frame and engine being swingable from a position generally aligned with the main chassis frame to a position outward therefrom and at an angle thereto to provide ready access to both sides of the engine for servicing without disconnecting the drive connection with the axle.

3 Claims, 3 Drawing Figures

PATENTED JAN 16 1973
3,710,885
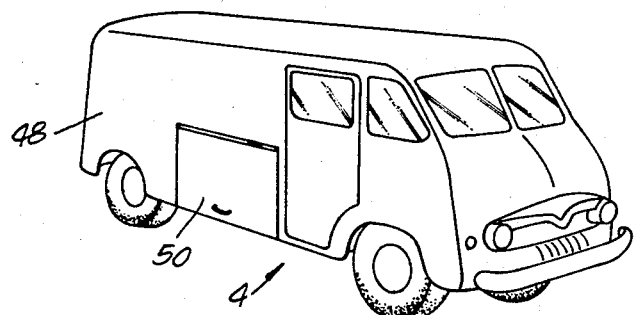
FIG. 1.
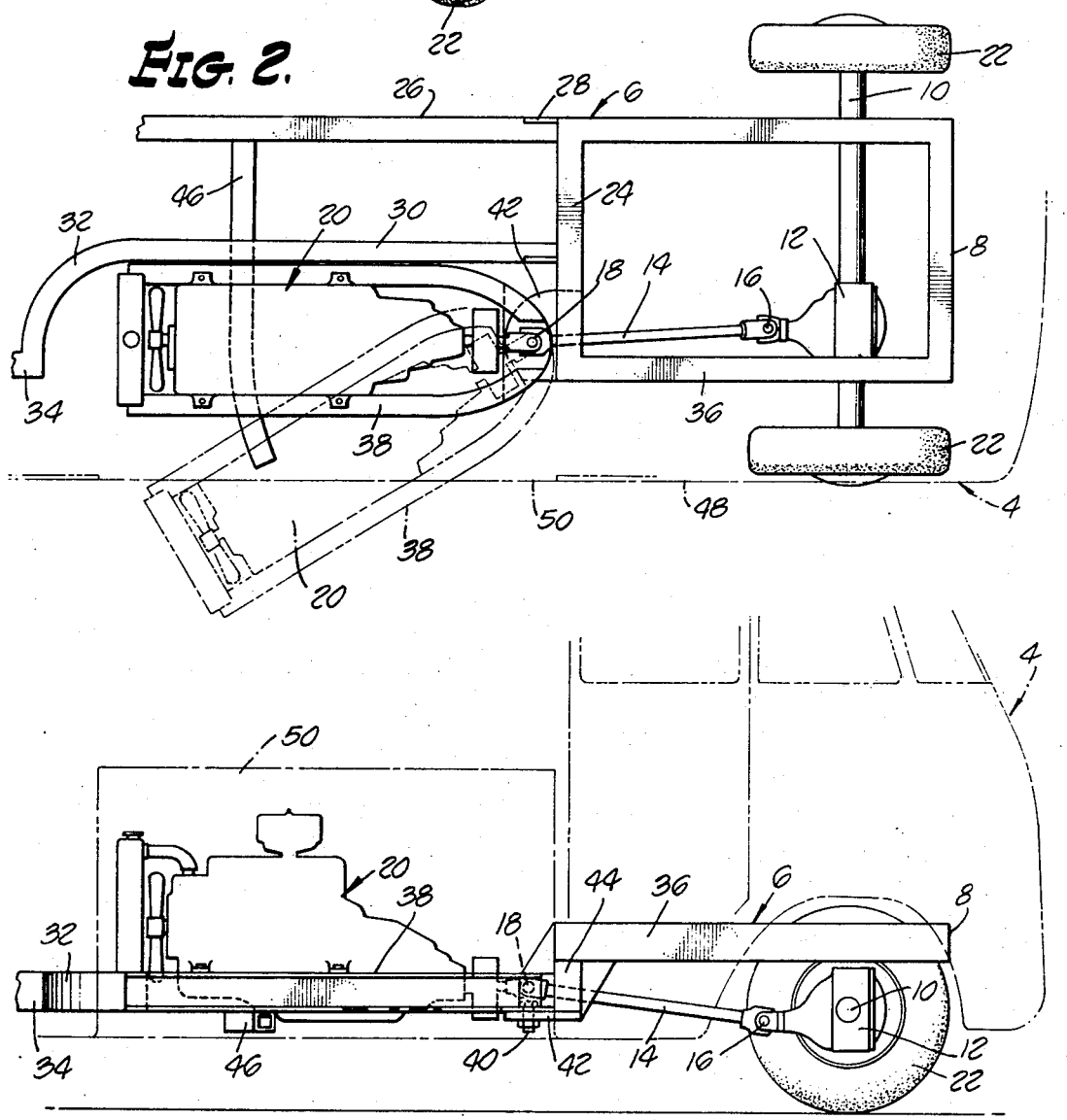
FIG. 2.
FIG. 3.
INVENTOR
ROBLEY C. BROWN
BY
*Allantlyockabee*
ATTORNEY

VEHICLE ENGINE MOUNTING

This invention relates to automotive vehicles, and more particularly to means for movably mounting the vehicle engine so that it can be swung from a normal operating position generally aligned with the main frame of the vehicle to an outwardly extended position at an angle to the main frame about a pivot which is coincident with a universal joint in the drive connection between the engine and an axle to be driven.

While the engine can be utilized in connection with any type of motor vehicle where it would be advantageous to utilize it, it is particularly adaptable for use in trucks, van type vehicle, motor homes and the like, where the front axle is a driven axle and the engine is disposed somewhat rearwardly thereof and connected thereto by a drive connection extending rearwardly from the differential housing on the axle to the drive shaft of the engine. Also, it is particularly adaptable to rear wheel drives wherein the engine may be mounted between the front and rear axles rather than beneath a hood projecting forwardly from the passenger compartment. Even where the engine is mounted beneath a forwardly projecting hood, the invention could be used to advantage so that the engine could be serviced and/or repaired without interference from the wheel fenders between which the hood is located.

The above and other objects will more fully appear from the following description in connection with the accompanying drawing:

FIG. 1 is a perspective view of an automotive vehicle, such as is adaptable for use with the invention;

FIG. 2 is a plan view of a portion of a vehicle chassis with an embodiment of my invention incorporated therein with the engine and sub-frame in full and broken lines in alternate positions and portions of the vehicle body in broken lines;

FIG. 3 is a side elevational view of the frame portion shown in FIG. 2 with portions of the body shown in broken lines.

There is illustrated a van type vehicle 4 having a frame generally indicated at 6 whose forward end 8 is supported by a front axle 10 provided with a differential housing 12 which is connected through a drive shaft 14 and universal joints 16 and 18 to a vehicle engine 20. With the front end drive such as illustrated, the front wheels 22 of course are the driving wheels.

The vehicle frame or main frame 6 in the specific embodiment illustrated, is provided with a cross member 24 inwardly of the axle 10. Positioned lower than the front frame section 8 is a rearwardly extending side frame member 26 connected to the forward section by a gusset 28 or other suitable connecting means. Also located lower than and extending rearwardly from the cross member 24 of the front frame section 8, is a second rearwardly extending frame member 30 which as illustrated at its forward end, is located in the middle of the vehicle and extends rearwardly and then curves laterally outwardly at 32 and finally straightens out at 34 in general alignment with the side member 36 of the front frame section and parallel to the first mentioned rearwardly extending frame member 26. Thus, the forward portion of the frame member 30 and its curved portion 32, together with part of the transverse member 24 on the front frame section 8, provide a recess in the general frame structure to accommodate the automobile engine 20. The engine itself is mounted upon sub-frame 38 whose forward end is pivotally connected by a nutted bolt 40 to a horizontal plate 42 which may be welded to a block 44, the latter in turn being welded to and extending downwardly from the cross member 24 of the front frame section 8.

It should be noted in FIGS. 2 and 3 that the pivotal axis of the sub-frame 38 provided by the nutted bolt 40, is in vertical alignment with the universal joint 18 which connects the engine to the drive shaft 14. Therefore, the sub-frame 38 and the engine 20 supported thereby can be swung outwardly as indicated by the broken lines shown in FIG. 2, so that both sides of the engine are accessible for servicing and repair without in any way disconnecting the engine 20 from the drive shaft 14 or the universal joint 16 which connects the drive shaft to the differential 12 and axle 10.

In order that the engine 20 and sub-frame 38 are properly supported remote from the pivotal connection 40, there is provided a cross member 46 which extends from the vehicle frame member 26 to the frame member 30 and beyond the latter, as shown in FIG. 2, so that a portion of the cross member 46 will lie beneath and support at least one side of the sub-frame 38.

While I have shown the sub-frame and engine swung out approximately 45° from its full line position in FIG. 2, it can of course be arranged to swing out even further and still be supported by a cross member, such as the member 46, merely by locating the cross member 46 a little further forwardly on the main frame 6 so that it will lie beneath the sub-frame 38 and still not have to extend beyond the confines of the vehicle body, indicated in broken lines at 48.

In FIG. 1 the body 48 is shown with a removable panel 50 which when removed, permits the engine and sub-frame to swing laterally outwardly to the remainder of the vehicle.

It will of course be understood that various changes can be made in the form, details, arrangement and proportions of the various parts and the location of the engine and driven axle, without departing from the spirit of the invention.

I claim:

1. An automotive vehicle having a main frame, a wheel equipped driving axle supporting the main frame, an engine, a drive connection between the engine and the driving axle, said drive connection including a universal joint adjacent the engine, wherein the improvement comprises: a sub-frame normally housed within the vehicle body and situated substantially within the overall confines of the main frame, said engine being supported on the sub-frame, and a pivotal connection between the sub-frame and the main frame vertically aligned with said universal joint permitting swinging of the sub-frame and engine outwardly relative to the main frame with the drive connection in its connected condition to expose the engine outwardly of the main frame to provide ready access to the engine.

2. The structure in claim 1, and a transverse member on the main frame and extending beneath and supporting the engine and sub-frame in the outwardly swinging position of said engine and sub-frame.

3. The structure in claim 1, and said sub-frame and engine each having an inboard side and an outboard side and having a primary location generally aligned with a peripheral portion of the main frame and swingable to a position at an angle to said peripheral portion and projecting laterally therefrom to provide ready access to both the inboard and outboard sides of the engine.

* * * * *